United States Patent [19]

Chow

[11] 3,806,657

[45] Apr. 23, 1974

[54] MERGING TIME SLOT INTERCHANGER FOR TIME DIVISION SWITCHING NETWORKS

[75] Inventor: Woo Foung Chow, Berkeley Heights, N.J.

[73] Assignee: Bell Telephone Laboratories, Incorporated, Murray Hill, N.J.

[22] Filed: Dec. 26, 1972

[21] Appl. No.: 318,536

[52] U.S. Cl. ............................................ 179/15 AQ

[51] Int. Cl. ............................................ H04j 3/00

[58] Field of Search .......... 179/15 AQ, 18 J, 18 GF, 179/15 BS, 15 AT; 340/174 TF

[56] References Cited

UNITED STATES PATENTS 3,751,597 8/1973 Bonyhard ...................... 179/15 AQ

*Primary Examiner*—William C. Cooper
*Assistant Examiner*—Joseph A. Popek
*Attorney, Agent, or Firm*—C. S. Phelan

[57] ABSTRACT

Adjacent-stage functions of time slot interchanging and mass series-parallel conversion in a time division multiplex switching network are merged into one switching matrix made up of row shift registers and column electric circuits. Matrix crosspoint coupling is provided by a selectively activated one-word shift register at each crosspoint. Each one-word register is controlled to receive a time slot word signal from its associated row register in accordance with a time slot interchanging algorithm, and the same one-word register provides readout to its associated column circuit in accordance with a mass series-parallel converter algorithm.

9 Claims, 7 Drawing Figures

MERGING TIME SLOT INTERCHANGER FOR TIME DIVISION SWITCHING NETWORKS

BACKGROUND OF THE INVENTION

1. Field of the Invention

This invention relates to time division multiplex switching networks; and it relates, in particular, to a method and apparatus for performing time slot interchanging and mass series-parallel conversion for such networks.

2. Description of the Prior Art

One prior art time division multiplex switching network technique involves the utilization of alternate stages of time slot interchanging and mass series-parallel conversion. An example of such a network is found in the copending U.S. Pat. application of R. S. Krupp and L. A. Tomko, Ser. No. 212,089, filed Dec. 27, 1971, now U.S. Pat. No. 3,740,480. The time slot interchanging function is performed by circuitry including at least one tapped shift register and selectively operated gates managed by a control memory arrangement for extracting time slot signals from the register in any arbitrary signal order. That order is usually different from the time slot signal order in which those signals were applied to the shift register. A mass series-parallel conversion is usually accomplished in apparatus of the two-dimensional shift register type wherein time slot words, in time division multiplex signal frames in respective input time division signal paths, enter input row shift registers in word series on one path and leave in parallel paths with corresponding words from the different input paths all occurring in word series on a common one of parallel output shift register paths.

In one form of switching network which is quite different from the aforementioned Krupp et al. network, switching is accomplished in matrices having signal buffer storage capacity at each matrix crosspoint and nonarbitrary time slot signal shifting at each matrix stage. An example of this type of network is contained in the U.S. Pat. No. 3,573,381 to M. J. Marcus. In that patent, however, the circuits at each matrix crosspoint include two full-frame shift registers for providing the aforementioned crosspoint storage; and, in addition, there must be provided at each crosspoint a substantial amount of signal counting and control logic. Also, unless the various communicating parties are forced to employ dedicated time slots in their respective multiplexing apparatus, the Marcus network would still require at least one time slot interchanging stage as a part of the switching network.

It has recently been proposed to do series-parallel conversion in a time slot interchanger as set forth in an article by H. Inose et al. entitled "Time-Division Switching Networks With Partial-Access Pulse Shifters Performing Serial-Parallel Conversion" and appearing at pages 762 through 768 in the August 1972, issue of *IEEE Transactions On Communications*, Vol. COM–20, No. 4. The conversion apparatus described in this article is a greatly enhanced prior art pulse shifter type of time slot interchanger which is adapted to perform, in one stage, time division multiplexing, time slot interchanging, and the converting of individual signal words from a bit-series format to a bit-parallel format. There is, however, no mass series-parallel conversion possible in the sense hereinbefore outlined for a mass series-parallel converter.

It is apparent from the foregoing that the prior art techniques for time slot interchanging and series-parallel conversion involve either great circuit complexity at matrix crosspoints or substantial circuit redundancy. For example as to redundancy, both the time slot interchanging function and the series-parallel conversion function have heretofore required a full-frame shift register per input time division line.

STATEMENT OF THE INVENTION

The foregoing problems of the prior art are alleviated by an illustrative embodiment of the present invention wherein the time slot interchanging function and the mass series-parallel conversion function are merged into one switching matrix of row shift registers and column circuits.

Matrix crosspoint coupling is provided by a selectively activated one-word shift register at each crosspoint. Each one-word register is controlled to receive a time slot word signal from its associated row register in accordance with a time slot interchanging algorithm, and the same one-word register provides readout to its associated column circuit in accordance with a mass series-parallel converter algorithm.

It is one feature of the invention that a basic switching network module for time slot interchanging and time shared space division switching is formed by two cascaded merging time slot interchangers and a stage of conventional time slot interchangers.

It is another feature that the present invention lends itself to implementation in charge coupled device technology.

BRIEF DESCRIPTION OF THE DRAWING

A more complete understanding of the invention and its various features, objects, and advantages may be obtained from a consideration of the following detailed description in connection with the appended claims and the attached drawing in which:

DETAILED DESCRIPTION

Figure 1:
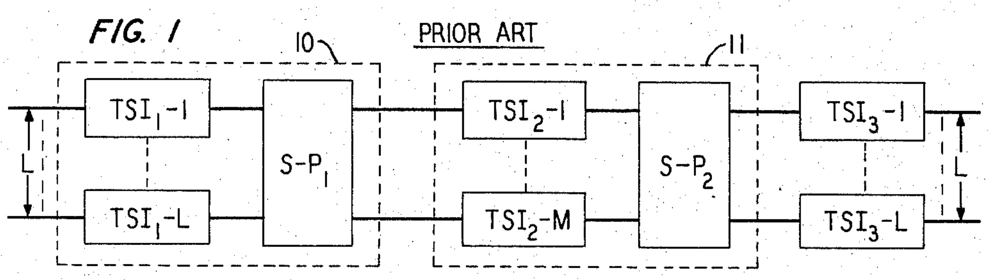
FIG. 1 is a simplified block and line diagram of a prior art time division multiplex switching network.

FIG. 1 illustrates in simplified block and line diagram form a prior art time division multiplex switching network of L input time division signal highways and L output time division signal highways. The network is of the type taught in the aforementioned R. S. Krupp et al. application. Only one direction of signal transmission, i.e., from left to right, in the drawing is shown. Thus, in effect all subscriber stations have their transmitters coupled through their respective time division multiplexers (not shown) to a corresponding one of the L input highways for each such multiplexer. Similarly, the receivers of those subscriber stations are coupled to the output highways of the network of FIG. 1 through their respective demultiplexers (not shown). A switching network of this type employs alternate stages of time slot interchanging and mass series-parallel conversion for achieving both the time slot interchanging function and the space path switching function which are often found in time division multiplex switching networks. Thus, in FIG. 1 the mass series-parallel converter stages $S–P_1$ and $S–P_2$ cooperate with an intervening time slot interchanging stage $TSI_2$ for performing the function of a time shared space division switch. In order to perform that function, the converter stage $S–P_1$ does an exchange mapping of circuit numbers and time slot numbers so that each converter output circuit number corresponds to an input time slot number at the input to the converter; and signals on those output circuits are in time slots which have numbers that correspond, respectively, to converter input circuit numbers. In the interchanger stage $TSI_2$, the respective time slot interchangers exchange signal time slot positions for, in effect, establishing call routing. M time slot interchangers are included in the stage $TSI_2$ for the illustrative system which includes L network input highways, each having M time slots per signal frame at their input to converter stage $S–P_1$. In converter stage $S–P_2$, time slot signals are subjected to a further exchange mapping into the conventional circuit and time slot number significance.

At the edge of the illustrated time division switching network, time slot interchanger stages $TSI_1$ and $TSI_3$, respectively, perform time slot interchanging in order to interface the calling and called time slots on calling and called time division highways with the operation time slot which is utilized to couple the call connection signals through the time shared space division switching part of the network. Pathfinding logic, a central control processor, clocking circuits, and time slot interchanger and converter details utilized are not shown because they are more fully developed in connection with the aforementioned R. S. Krupp et al. application. Such details are not essential to an understanding of the present invention. Interchanger stage $TSI_1$ and converter stage $S–P_1$ are enclosed in a broken-line box in FIG. 1 to indicate the portions thereof which will be functionally combined to form a merging time slot interchanger 10 of the present invention in a manner which will be subsequently described. Similarly, the stages $TSI_2$ and $S–P_2$ will be functionally combined to form a further merging time slot interchanger 11.

Figure 2:
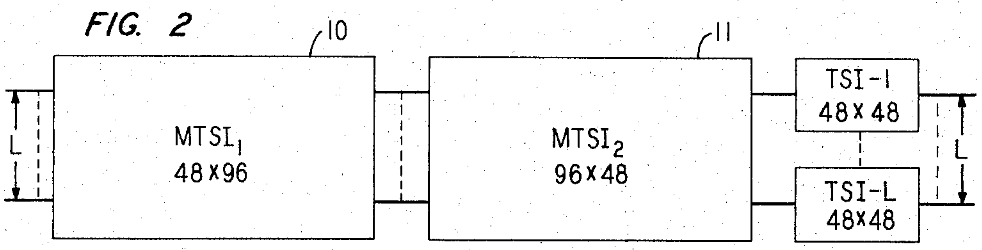
FIG. 2 is a similar block and line diagram of the FIG. 1 network modified in accordance with the present invention.

FIG. 2 is a simplified block and line diagram of a time division switching network corresponding to that illustrated in FIG. 1 but utilizing cascaded merging time slot interchangers 10 and 11. Those interchangers are further designated as merging time slot interchangers $MTSI_1$ and $MTSI_2$. The remainder of the present description is directed toward details of the hardware configuration of the merging time slot interchanger and which make it possible to combine advantageously the interchanger and converter functions of adjacent network stages from a network of the type illustrated in FIG. 1. As was the case with FIG. 1, details of a central control processor, clock timing logic, and pathfinding logic are not shown in FIG. 2 because they comprise arithmetic logic and control functions of a type, which are well known in the art, for providing control timing and control data for a network once it has been determined how the network is to operate in terms of sequences of the functions to be performed.

Before considering in full detail a merging time slot interchanger, it is useful to develop the nature of the mass series-parallel conversion function which will be utilized therein. It has been demonstrated in the aforementioned R. S. Krupp et al. application that the series-parallel conversion function can be performed by means of a two-dimensional shift register with selectable gate connections so that the register is actually a periodically reorganized array of bistable circuits. Thus, circuits operate in alternation as plural input row shift registers and plural output column shift registers. The R. S. Krupp et al. U.S. Pat. application Ser. No. 212,005, filed Dec. 27, 1971, entitled "Electrically Controllable Steering Arrangement for Magnetic Single-Wall Domain Propagation Paths," now U.S. Pat. No. 3,723,985, and assigned to the same assignee as the present invention, discloses a field access magnetic single wall domain series-parallel converter in which a first set of input signal frames from different circuits can be shifted into the converter at the same time that another set of signal frame information is shifted out of the same converter.

Other converting arrangements are known in the art but all utilize a shift register along at least one coordinate of the converter matrix so that they effect a time skew of corresponding time slot signals in parallel time division multiplexed signal channels. For example, in a mass series-parallel converter for four input circuits and four output circuits, assume that a signal in input time slot No. 4 on a first input, or row, circuit goes out of the converter on the fourth output, or column, circuit with only one time slot of real delay. However, a signal in the same input time slot No. 4 on the fourth input signal row circuit goes out on the fourth column circuit with at least four time slots of real delay with respect to the corresponding time slot No. 4 signal that came in on the first row circuit.

Figure 3:
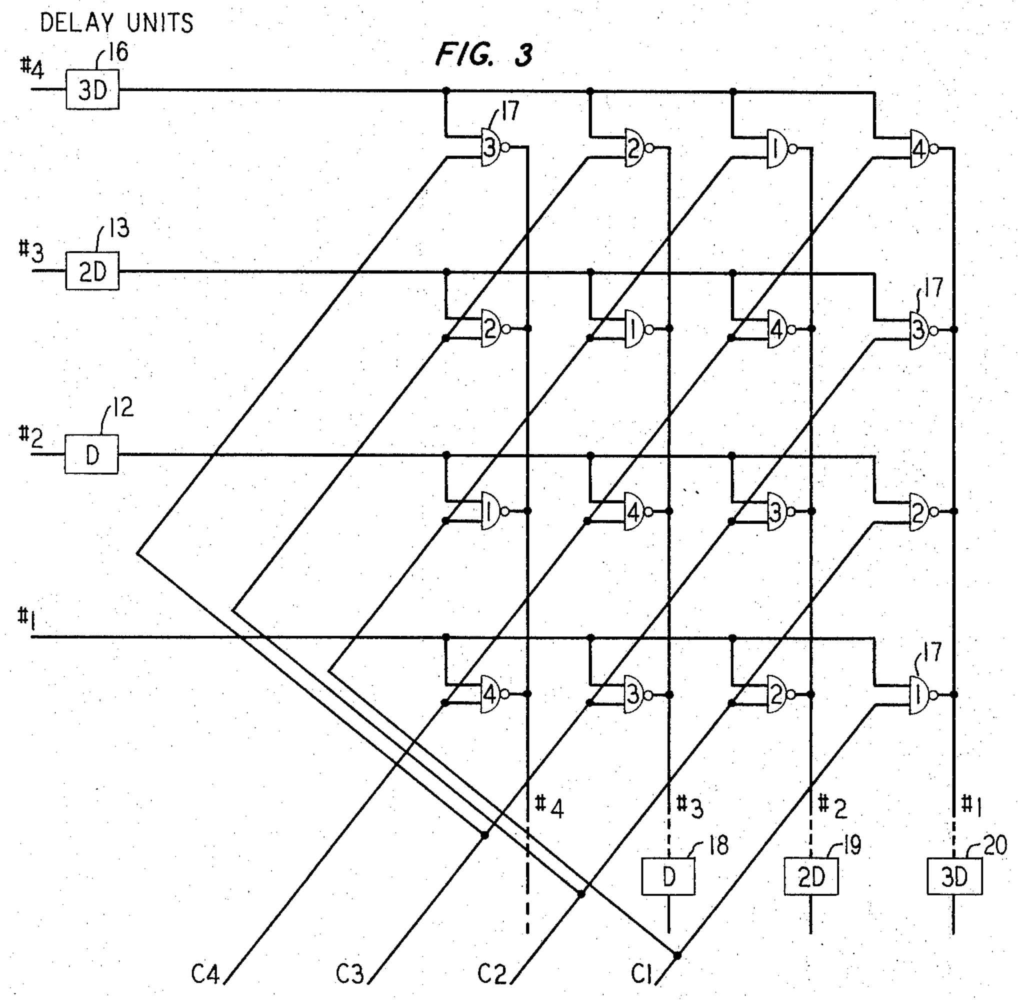
FIG. 3 depicts an electric circuit matrix for performing a mass series-parallel conversion in accordance with an algorithm advantageously employed in the present invention.

FIG. 3 illustrates in schematic form another 4×4 series-parallel converter; but in this case the converter row and column circuits are electric circuits, and it includes crosspoint coincidence gates that are utilized for controlling the interconnection between row and column circuits. The row circuits are numbered 1 through 4 from the bottom to the top of the matrix, and the column circuits are numbered 1 through 4 from right to left on the matrix in order to facilitate an understanding of the manner in which the matrix is operated. Each of the row circuits is provided at its input with a different amount of time slot signal delay in order to provide the aforementioned time skew function which is necessary to produce a true series-parallel converter effect. Thus, row circuit 1 has no delay connected therein, while row circuits 2 through 4 include delay circuits 12, 13, and 16, respectively, for providing one, two, and three units of delay, respectively. Each unit of delay corresponds to the time duration of one time slot signal.

Alternatively, the time skew can be produced at the multiplexer level of the communication system by placing simultaneously occurring samples from different subscriber circuits served by different multiplexers into different time slot positions in their respective multiplexers for thereby effecting the desired time skew.

That type of technique, however, assumes dedicated time slot positions for each subscriber served by a particular multiplexer. As previously suggested, some time skew is needed in order to route corresponding input time slot signals, i.e., signals in time slot No. 1, on all of the input circuits No. 1 through No. 4 in FIG. 3 onto a common output column circuit of the converter, i.e., to column circuit No. 1.

Crosspoint coincidence gates 17, only a few of which are actually so numbered in FIG. 3, are operated in a particular sequence representing a series-parallel conversion algorithm. In that sequence a different set of four gates (for the case illustrated in which there are four input circuits and four output circuits) is operated in each successive phase of the sequence. Each crosspoint gate has an input connection from a row circuit of the conversion matrix and has an output to a column circuit which intersects the row circuit at that crosspoint. The illustrated gates are conventional NAND coincidence gates for which a coincidence of relatively high input signals on all input connections results in the production of a low output signal, and the absence of a high signal on at least one of the input connections produces a high output signal. A second input connection is provided for each coincidence gate to enable that gate for providing the aforementioned row-column coupling at its respective crosspoint during the phase of the aforementioned sequence in which the set of gates including that particular gate is to be operated.

For the illustrated 4×4 converter, a four-phase sequence provides the necessary series-parallel converter function, and each of the gates is further provided with a reference numeral on the gate indicating the phase number set with which it is to be operated. For example, a ring counter, not shown, is advantageously driven at the time slot signal rate on the converter input circuits, and thus provides an enabling signal on counter output leads C1 through C4, illustrated in the lower left-hand portion of FIG. 3. The lead C1 extends to all of the crosspoint gates bearing the numeral one; circuit C2 extends to an enabling input connection of all crosspoint gates 2, etc. The foregoing gate operation sequence cooperates with the aforementioned different delays in the various converter input circuits to convert the signals from the input circuits into an output circuit signal pattern wherein there is an exchange mapping of circuit numbers and time slot numbers. However, two types of skew are advantageously imparted to time division signals by the converter of FIG. 3. They receive the usual skew in that simultaneously occurring input time slot signals on different circuits appear in sequence on a common output circuit. An additional skew is imparted in that sequentially occurring signals on a common input circuit appear on different output circuits in sequential output time slots, rather than simultaneously as in some prior converters.

Thus, in a first output time slot from the converter of FIG. 3, the gate control signal C1 is high and output circuits No. 1 through No. 4 produce signals from the input circuits in a pattern L11, L42, L33, L24, respectively, wherein the tens digit of each character indicates converter input circuit number providing the time slot signal appearing in that output time slot, and the units digit of the character indicates the actual input circuit time slot number prior to the time skew delay. For example, the character L42 means that on output column circuit No. 2 the input time slot No. 2 signal from input circuit No. 4 appears in the output time slot for which the character is employed. By construction of a table (not shown for FIG. 3) of output signals appearing on the converter output circuits in one full recurrence of the gate set enabling sequence, it can be seen that signals from a given input circuit appear on different converter output circuits but have a time skew corresponding to their original input circuit time sequence.

Once the skew, of both types, has been injected, there is no further need for providing similar time skewing delays (by circuits such as 12, 13, and 16) in a cascaded chain of an even number of mass series-parallel converters, if the outputs of each converter stage are coupled to correspondingly numbered inputs of the next succeeding stage. This result is achieved because a second conversion, without a repetition of the time skewing delays, restores time slot signals to the same serial order they had on their respective original input circuits to the first converter stage, but with a time skew of corresponding time slots which is the same as that which was realized at the inputs to the gates at the left-most column of crosspoints in the first converter stage, as illustrated in FIG. 3. Thus, the signals can proceed into a further network stage without the necessity for providing further specific delays.

At the network output, however, and after an even number of series-parallel conversions, an inverse set of delays must be provided to remove the time skew. This is indicated in FIG. 3 at the lower portion of the respective converter column circuits wherein the column circuit No. 4 has zero delay; while column circuit No. 3 includes in series a one-unit delay circuit 18, column circuit 2 includes a two-circuit delay circuit 19, and column circuit 1 includes a three-unit delay circuit 20.

Figure 4:
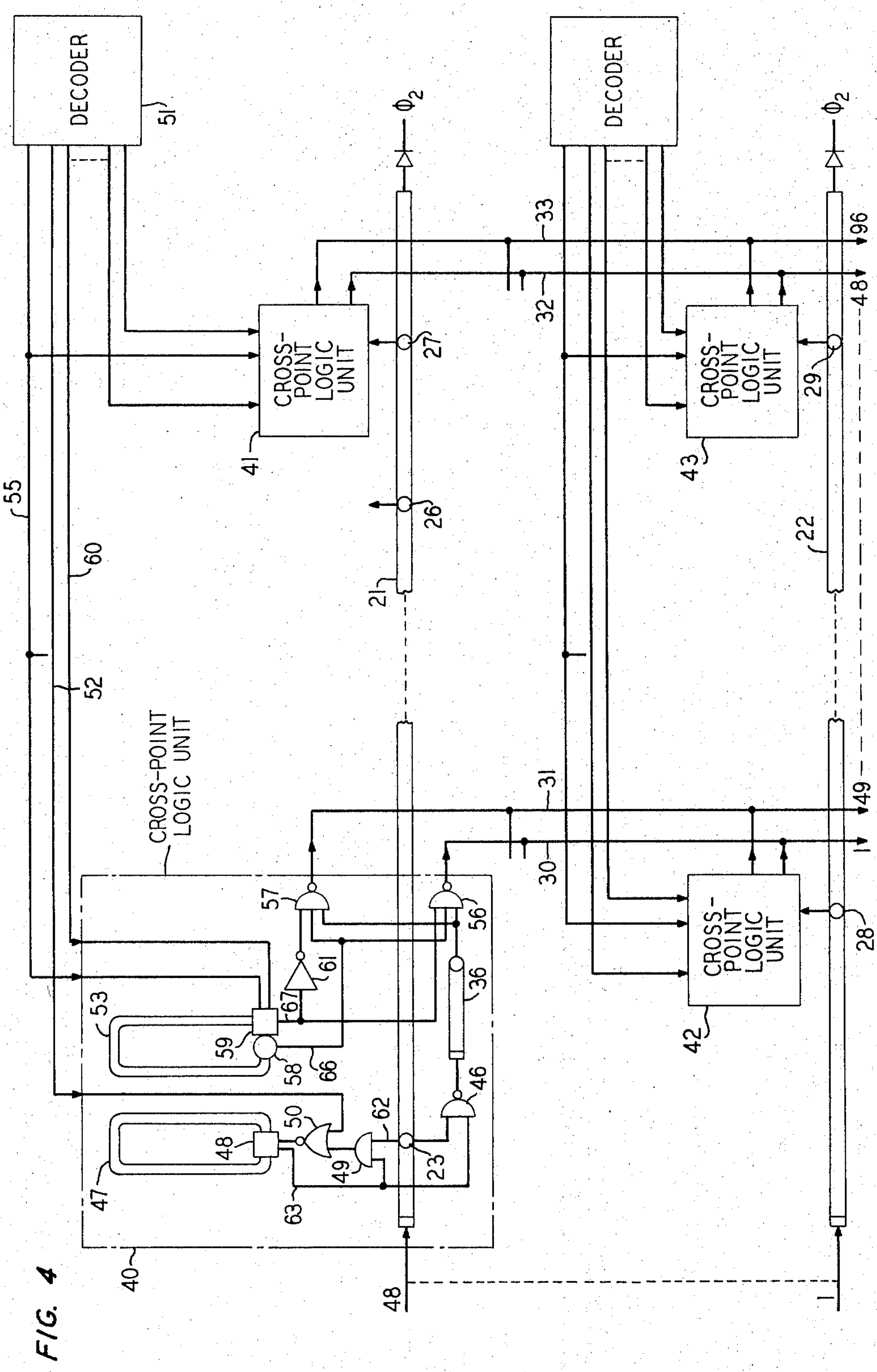
FIG. 4 is a more detailed schematic diagram of a merging time slot interchanger of the type employed in FIG. 2.

FIG. 4 illustrates basic schematic detail for a merging time slot interchanger, such as the interchanger 10 of the present invention. It comprises a switching matrix with particular signal storage cross-point organization to be described. Assuming a matrix of rectangular configuration, i.e., 48 input circuits by 96 output circuits, the converter of FIG. 4 is illustrated by means of two input row signal circuits and four output column circuits. All of the remaining row and column circuits of the matrix which are not shown would be provided in a similar fashion.

The interchanger matrix includes an input row shift register signal propagation path for each row circuit, and two such shift registers 21 and 22 are shown for propagating time slot signals from left to right, as illustrated in FIG. 4. Each such row shift register is indicated by a rectangular strip extending across substantially the full width of the figure, and includes a number of stages which is sufficient to store in bit-series fashion the signals of 47 successive time slots in a system wherein time division signals applied to the register include 48 time slots per frame. Readout stations, such as the stations 23, 26, and 27, are schematically represented by circles at spaced locations along the shift register 21; and all such readout stations along the register are advantageously spaced ten bit positions apart for a system in which each time slot signal includes ten signal bits. Similarly, readout stations 28 and 29 are indicated in the shift register 22. The readout stations provide nondestructive readout of time division signals propagating along the respective shift registers.

The input row shift registers of the merging time slot interchanger in FIG. 4 are advantageously implemented in the charge coupled device (CCD) technology as indicated, for example, in my copending U.S. Pat. application Ser. No. 296,577, filed Oct. 11, 1972, entitled "Shift Circuits With Output Control Gated by Combined Control Memory," and assigned to the same assignee as the present application, now U.S. Pat. No. 3,786,192. Additional illustrations of shift registers and electrical input and output circuits therefor in the CCD technology are to be found in an article "Charge-Coupled Devices — A New Approach to MIS Device Structures" by W. S. Boyle and G. E. Smith, which appeared at pages 18 through 27 of the July 1971 issue of the *IEEE Spectrum*, and in a paper entitled "A Simple Charge Regenerator for use with Charge-Coupled and Bucket-Brigade Shift Registers and the Design of Functional Logic Arrays" by M. F. Tompsett, a digest of which paper appears at pages 160 and 161 in the *Digest of Technical Papers* for the 1971 IEEE International Solid-State Circuits Conference.

Figure 6:
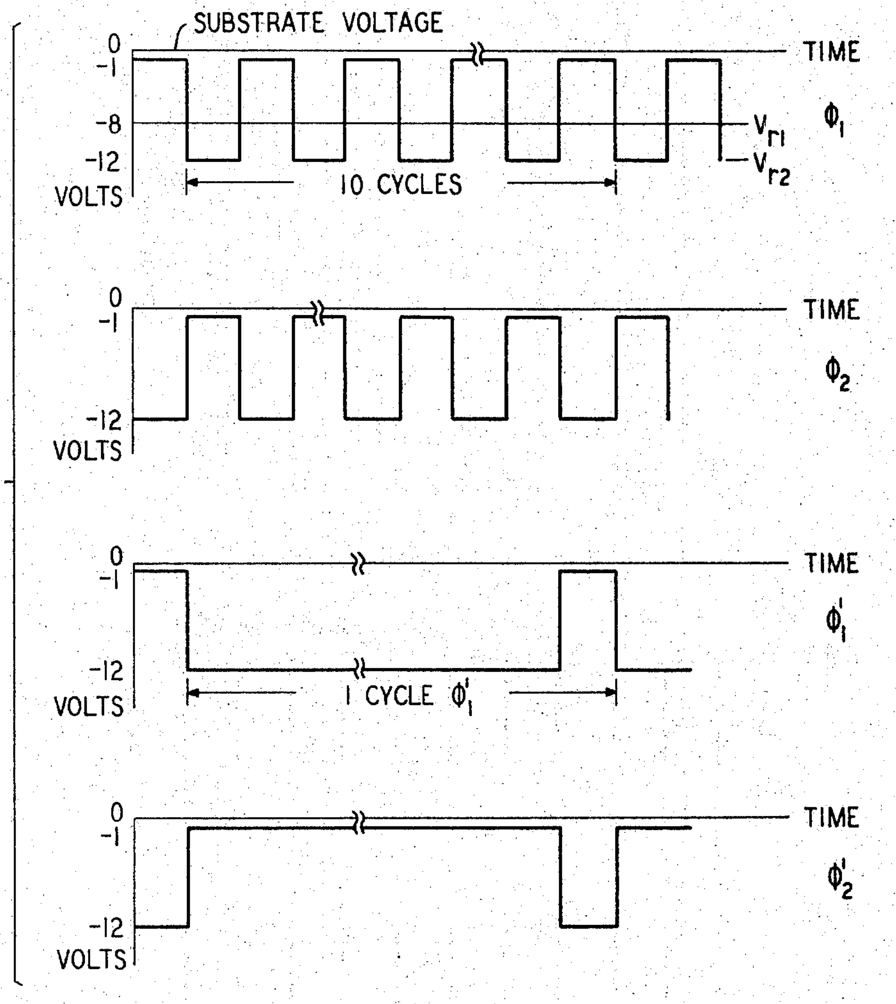
FIG. 6 is a group of timing diagrams illustrating signals used to control operation of the invention.

Propagation is achieved by applying a two-phase drive in the form of shift signals $\Phi_1$ and $\Phi_2$, not specifically shown in FIG. 4, and supplied by a system clock source also not shown in the drawing. Various shift clock signals and reference voltages mentioned in this description are illustrated in FIG. 6. Drive and readout arrangements for CCD registers are more specifically considered in my aforementioned copending application and are treated in some detail hereinafter in connection with FIG. 7. A charge packet is inserted at an input writing stage at the left end of a register in FIG. 4 and it is removed at the right end by way of a diode connected to a clock source $\Phi_2$.

Interchanger output is provided in column electric circuit wires such as the wires 30, 31, 32, and 33 in FIG. 4. Each wire provides signal to a different output circuit of the matrix; and each pair of wires, such as the wires 30 and 31, may be considered to represent a column circuit of the matrix in a manner which will subsequently become clear. Signal coupling between row shift registers and column circuits is provided by way of a one-word, i.e., one-time-slot, buffer shift register, such as the register 36, illustrated in FIG. 4. Each such register comprises the essential signal propagation path through a crosspoint logic unit, to be described, which controls the time-selective entry of information signals from row propagation paths and the time-selective readout of those signals to respective column circuits.

Rectangular time slot interchanger stages in general are known in the art and allow internal switching network expansion of space division paths for achieving reduced blocking probability. For example, in each interchanger time slot, signals in the first half of the time slots of each interchanger output frame are steered to one set of output wires corresponding to, e.g., wires 30 and 32 in FIG. 4, while signals destined to lie in time slots in the last half of each output frame are steered to the other set of wires, corresponding to e.g., wires 31 and 33. At the output edge of a switching network, a complementary concentration is performed by a time slot interchanging function wherein the interchanger stage includes, for example, 96 input shift register rows of full-frame (48 time slots) shift registers organized in pairs and only 48 output circuits for a register pair. The time slot signals are, thus, restored to their respective halves of a normal time division multiplex signal frame.

Each crosspoint of the merging time slot interchanger of FIG. 4 includes a crosspoint logic unit, such as the four units 40 through 43 shown in the drawing. Only one such unit, i.e., unit 40 is indicated in a degree of detail since all such units are advantageous of the same format. Each of these units provides selective coupling between an interchanger row shift register and a column circuit at one matrix crosspoint. The unit logic employed is shown in simplified form in the detailed illustration of the unit 40 in FIG. 4, and it will be hereinafter presented in greater detail in connection with FIG. 7.

In FIG. 4 a NAND gate 46 is provided for a controllable coupling element between a read station 23 and the data signal input to the one-word shift register 36. This gate is enabled at appropriate times by an output signal from a control memory loop shift register 47. That register stores control information for controlling the coupling from shift register 21 to the shift register 36 in accordance with a time slot interchanging algorithm. In other words, along each row shift register of the merging time slot interchanger, each input time slot signal is copied into a different one of the one-word crosspoint shift registers coupled to that row to await subsequent coupling to a column circuit having a number corresponding to the merging time slot interchanger output time slot number into which it is desired to shift the aforementioned input time slot signal.

The input loop shift register 47 has a number of stages, i.e., bit locations, sufficient to accommodate one control signal bit for each time slot of an interchanger input signal frame. This loop register is of the same type as the row shift registers, but it is operated at one-tenth of the bit rate, assuming interchanger input time slot signals of ten signal bits each. A read-write station 48 is included in the loop shift register 47 for allowing each control signal bit to be available, on a destructive readout basis, for enabling NAND gate 46 as that bit arrives at station 48. The same bit is also utilized as an enabling input signal to an AND gate 49 which provides information-signal-controlled recirculation of loop register control signals in response to a busy bit signal state in each time slot signal provided to the input of register 21 at the read station 23 thereof.

A more detailed discussion of the busy bit technique for controlling time division switching network connections is contained in the copending U.S. Pat. application of R. S. Krupp, Ser. No. 212,348, filed Dec. 27, 1971, entitled "Busy Bit for Time Division Multiplex Signals to Reduce Signal Processing Time," now U.S. Pat. No. 3,743,789, and assigned to the same assignee as the present application. In brief, the busy bit technique permits one bit in each time slot of a time division multiplex signal to control the retention of network gate control information as that time slot signal is propagated through the network. The bit is advantageously written into the time slot signal at the multiplexer level of the communication system. In the presently illustrated embodiment of the invention, control signal information is written into the control memory as a result of operations of a central control processor, rather than by utilizing the busy technique.

Output from the AND gate 49 is applied through a NOR gate 50 to the writing input of the read-write station 48 for determining the nature of control information which is to be recirculated in accordance with the signal condition of the busy bit. In addition, the NOR gate 50 permits the application of new control memory signals from the central processor by way of a decoder 51 and a circuit 52. Each input control memory loop 47 actually stores only one control signal bit because each crosspoint register, such as the register 36, can receive only one time slot word signal per input signal frame to the interchanger. That signal bit is propagated around the loop 47 at the time slot rate of those incoming time division signals. That output control signal bit from the loop 47 also enables the application of the shift clock signals $\Phi_1$ and $\Phi_2$ to the one-word shift register 36, in a manner which will be described, so that time division data signals are applied to that one-word register at only those times which are appropriate within the scope of the time slot interchanging algorithm employed.

Output from a crosspoint logic unit in FIG. 4, and specifically from the shift register 36 of the unit 40, is controlled by an output control memory loop shift register 53 and a pair of NAND gates 56 and 57. The loop shift register 53 is also a charge coupled device shift register of the same type as the registers 21 and 47. Likewise, it is operated at one-tenth of the time division signal bit rate and has circulating therein a first control signal bit which represents the time at which the contents of the register 36 are to be read out to one of the column circuit wires 30 or 31 in accordance with the mass series-parallel converting algorithm as described hereinbefore in connection with FIG. 3. The state of this control signal bit is nondestructively coupled out of the loop register 53 at a read station 58 and applied as an enabling input signal to the NAND gates 56 and 57. The read station 58 is of the same type as the similarly indicated read stations along, for example, the row shift register 21.

Gates 56 and 57 are provided to couple the output from register 36 to the column circuit wires 30 and 31, respectively. The aforementioned single control bit in loop register 53 is written therein in the same manner as control data is written in the register 47, but the register 53 is written with this bit only when the system is initialized. This fixed control signal bit remains the same for all furture merging time slot interchanger operations because the mass series-parallel conversion algorithm remains the same regardless of the nature of call connection paths that are established through the merging time slot interchanger. Of course such control signal bit in the loop register 53 also enables the application of the clock signals $\Phi_1$ and $\Phi_2$ to the shift register 36, in a manner to be described, for outpulsing any contents of that register through one of the gates 56 or 57.

A second control signal bit is also written into the loop shift register 53 to indicate by its presence or absence which of the column circuit wires 30 or 31 is to receive the time slot signal from register 36. This additional control bit may be different for each new call connection utilizing the particular crosspoint logic unit; and it is written into the loop at essentially the same time as control signal information is written into the associated loop register 47 for the same unit 40. This second control signal bit in loop register 53 is adjacent to the first and is nondestructively coupled out of a read-write station 59 which is included in the loop 53 adjacent to the read station 58. The station 59 is similar to the station 48 in the input loop register 47 but it includes no provision for the controllable recirculation of signal bits. In other words, all control signal information in the loop register 53 recirculates therein continuously until it is overwritten by new information provided from the decoder 51 by way of a control information lead 55 and a control lead 60. Output derived from the loop register 53 by way of the read-write station 59 is applied directly as an enabling input signal to the NAND gate 56. The same output is applied through a signal inverter 61 as an enabling input for the NAND gate 57. Thus, a binary ONE variable control signal is indicated by the presence of a charge at the read-write station 59 for enabling the gate 56. Similarly, the absence of a charge indicates a binary ZERO and that signal state is inverted to enable the gate 57.

Figure 7:
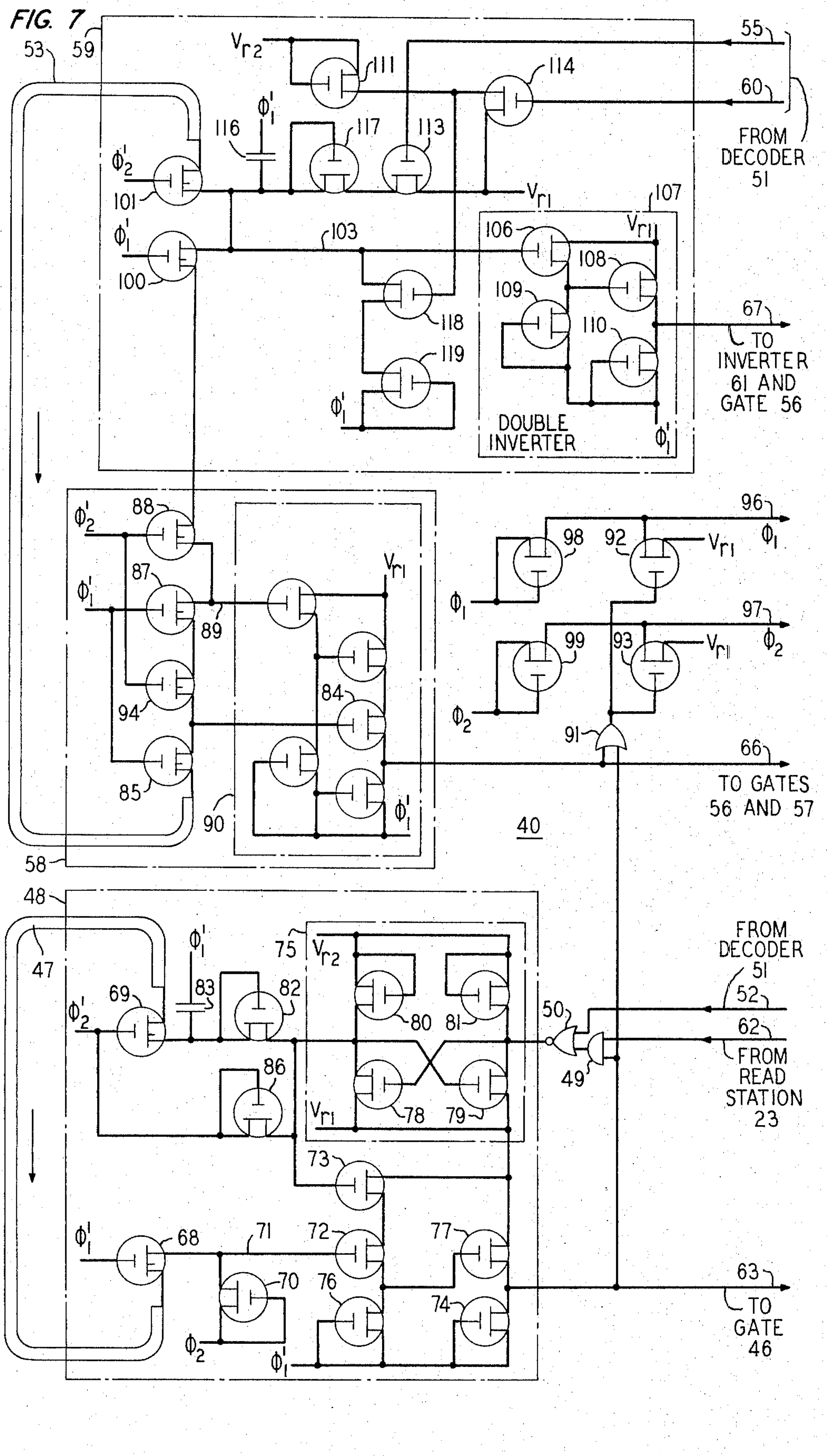
FIG. 7 is a schematic diagram of a portion of the crosspoint circuit logic unit utilized in FIG. 4.

Before considering detail of the crosspoint logic unit in connection with FIG. 7, it is useful to summarize some more general concepts in regard to the merging time slot interchanger of FIG. 4. For example, the presentation in connection with FIG. 4 assumes that the separate skew delays, such as the delays 12, 13, and 16 in FIG. 3, or their equivalent, have already been provided in the signals on row circuits No. 1 through No. 48. Accordingly, such specific delay circuits are not shown in FIG. 4.

Signals propagated along the row shift registers of FIG. 4 are coupled into the respective one-word crosspoint shift registers 36 in accordance with a time slot interchanging algorithm for each row. This is accomplished by control signal bits written in appropriate locations in the various input control memory loop registers. In order to determine the proper location for such a bit in a particular control memory register, it is necessary to determine first which interchanger column output path will be utilized, and more will be described subsequently in regard to that determination. Once that output column circuit has been determined, a control bit is written into the input control memory loop 47 for the logic unit 40 which is at the intersection of the output column circuit and the input row circuit on which the given time slot signal will be received. This control bit is written into the memory in the time slot in which a particular time slot signal will reach the crosspoint logic unit at which it is to be directed onto an output column circuit. The number of that time slot is the sum, modulo-48, of the input time slot number, plus the column circuit number, and plus the number of time slots of skew in that input signal. Column circuits are numbered 1 through 48 from left to right, as illustrated in FIG. 4.

Information signals are taken out of the crosspoint registers 36 by the previously discussed series-parallel converter algorithm. This is accomplished by control signal bits written in appropriate locations in output control memory loops 53 of the various crosspoint logic units when the network is initialized and retained thereafter. Those locations are chosen so that the crosspoint shift registers 36 along an interchanger row are emptied into their respective column circuits in a fixed sequence running opposite to the direction of signal propagation into that row shift register. Each successive row of the merging time slot interchanger has its sequence slipped in phase by one time slot with respect to an immediately preceding row in the sequence of rows. This type of sequence slipping is apparent from the output time slot number characters appended to the schematic representations of respective crosspoint gates 17 in FIG. 3.

Given a rectangular merging time slot interchanger configuration, such as the one in FIG. 4 with twice as many output wires as there are input circuits, an overlapping numbering plan is employed. A first output wire of each column circuit pair is numbered from left to right as shown in FIG. 4 for indicating the interchanger outputs No. 1 through No. 48. Then the other wire of each column circuit pair is similarly numbered across the interchanger starting with the assignment of the No. 49 to the column circuit wire 31. If rectangular interchangers are to be connected in tandem, a following rectangular interchanger uses the overlapping numbering plan on its input circuits, and the output wires of a preceding interchanger are connected to correspondingly numbered inputs of the following interchanger.

In order to realize a square merging time slot interchanger, i.e., one having equal numbers of inputs and outputs, it is necessary only to omit one set of the column circuit wires, e.g., wires 31 and 33, as well as the inverter 61 and the NAND gate 57 in each crosspoint logic unit. In this situation output control memory loop registers 53 could also be omitted in favor of employing a ring counter and appropriate gate enabling circuits as discussed in connection with FIG. 3 for controlling the NAND gates 56 of the various interchanger stage logic units.

If a merging time slot interchanger of rectangular configuration is required to have more inputs than outputs, such as for example the interchanger 11 in FIG. 2, only one set of column circuit wires is utilized, as hereinbefore indicated for the case of a square interchanger stage. Crosspoint logic units are slightly modified to reflect a pairing of row shift registers corresponding to a pairing of column circuit wires in a preceding interchanger stage and following an overlapping numbering plan. Thus, crosspoint logic units of corresponding stages of paired row shift registers share a common crosspoint shift register 36 and associated logic for coupling the output of that register to a column circuit. In addition, the outputs of the NAND gates 46 of a pair of such logic units are coupled through an OR gate, not shown, into the input writing stage of the common shift register 36.

Considering for a moment volume manufacturing concepts, a merging time slot interchanger of the type shown in FIG. 4 can be organized in different ways for manufacture. One way is to form each row shift register and its associated crosspoint logic units on a single semiconductor integrated circuit chip. A plurality of such chips are then provided on a common substrate with corresponding column circuit wires interconnected in order to form the full interchanger stage of FIG. 4. If only a time slot interchanger stage is required, such as the final network stage in FIG. 2, the same chips are advantageously utilized but they are differently connected. For the plain time slot interchanger case, no column circuit connections are made between chips. Instead, all 48 column wires of a chip are connected together to a common network output highway. Gates 56 of the logic units on such a chip are then scanned by enabling signals in a fixed sequence which produces the effect of unloading one long shift register through its final, i.e., right-most, stage by simply unloading the respective shift registers 36 of a row in a sequence running from right to left across the interchanger stage as illustrated in FIG. 4.

Figure 5:
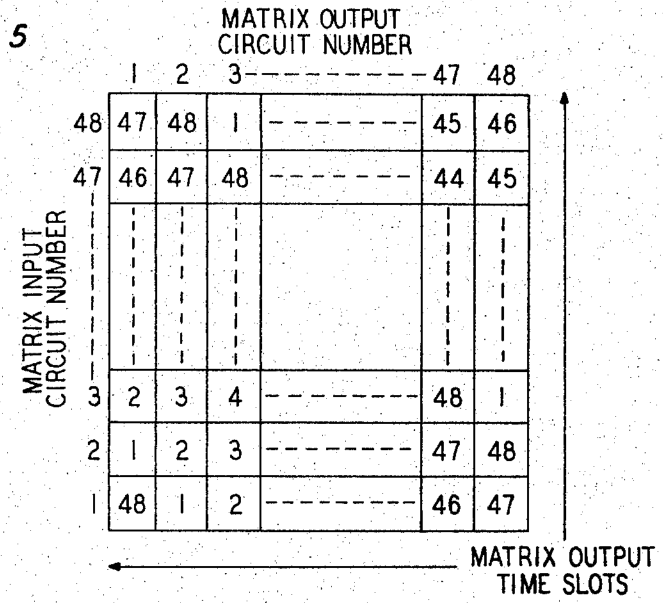
FIG. 5 is a table illustrating the nature of merging time slot interchanging operation.

FIG. 5 illustrates a series-parallel conversion chart for the merging time slot interchanger of FIG. 4, assuming that only the column circuit wires 30, 32, etc, are utilized, i.e., assuming a merging time slot interchanger with only 48 output wires. The chart further assumes no time slot interchanging function in order to facilitate the demonstration of the series-parallel converter operation as applied to the interchanger of FIG. 4. This assumption means that the table of FIG. 5 represents the type of outputs that would be realized, for example, from a consideration of signals in interchanger input time slots 1 through 24, which are the only signals that could be switched to any of the output column wires of the set including wires 30 and 32. Column wire numbers 1 through 48 are indicated from left to right across the top of the table in FIG. 5, the same as the arrangement of column wire numbers in FIG. 4. Along the left side of the table are indicated interchanger matrix input signal path, or row, numbers 1 through 48 in the same sequence as the numbering of rows in FIG. 4. Numerals appearing at row and column intersections in the table of FIG. 5 are converter clock phases corresponding to C1–C4 in FIG. 3. Those phases in FIG. 5 also represent the numbers of those time slots, which are concurrent with like numbered input time slots, in which interchanger registers 36 and column wires are electrically coupled together. The table also reflects a minimum of one time slot delay in transmission through the crosspoint shift register 36. Although the complete table of output time slot numbers is not filled in, sufficient numbers are indicated to demonstrate the pattern of series-parallel converter operation.

FIG. 7 presents schematic detail of a crosspoint logic unit, such as the unit 40 in FIG. 4; and that unit is operated by shift clock and reference signals depicted in FIG. 6. The unit includes mainly the interface logic for the control memory loop shift reigsters 47 and 53. An input to the unit appears on a lead 62 which connects an output of read station 23 in FIG. 4 to an enabling input connection of the AND gate 49. In addition, inputs are provided on leads 52, 55, and 60 from the decoder 51 in FIG. 4. Outputs from the unit appear on a lead 63 which extends to an enabling input of NAND gate 46 in FIG. 4. An output is also supplied on a lead 66 to enabling inputs of gates 56 and 57 in FIG. 4, and on a lead 67 to the input of inverter 61 and to an enabling input of gate 56 in FIG. 4. Control memory loop shift registers 47 and 53 are shown at the left-hand side of FIG. 7 with arrows in the drawing indicating control signal propagation in the counterclockwise direction in both of those loop registers.

The read-write station 48 is considered first and appears in the lower portion of FIG. 7. This station is somewhat similar in concept to that shown in my aforementioned copending application, but it is modified in order to hold an output signal on the lead 63 for substantially an entire time slot rather than during only the busy bit time as was the case in the prior application. In FIG. 7 the well-known insulated gate field effect transistor (IGFET) schematic symbol is utilized to represent both the transistors employed in the electric circuit parts of the figure and the potential wells in the charge coupled device shift register path, since the functions performed by an IGFET and at a potential well in the shift register are similar in many respects. Transistor symbols representing potential wells have in their schematic representation an extra line adjacent to the source connection of the transistor and not otherwise connected to the circuit.

The control memory loop shift registers are advantageously of the charge coupled device variety as previously noted. Each register includes a succession of potential well positions defined by shift clock signal application circuits formed as metallic overlays on an integrated circuit substrate including those positions. The shift registers are controlled by negative-going shift clock pulses $\Phi_1'$ and $\Phi_2'$ in FIG. 6. Those pulses occur at one-tenth of the repetition rate of the clock pulses $\Phi_1$ and $\Phi_2$, of FIG. 6, which are utilized primarily for the interchanger row and crosspoint shift registers. All of the clock pulses are negative-going to an illustrative voltage level of approximately 12 volts. Whereas the $\Phi_1$ and $\Phi_2$ pulses are of equal duration and each waveform has approximately a 50 percent duty cycle, the $\Phi_1'$ pulses persist for approximately nine and one-half bit times. Each $\Phi_1'$ pulse is followed by a single $\Phi_2'$ pulse of one-half bit time duration. Reference voltage supplies $V_{r1}$ and $V_{r2}$, shown on the $\Phi_1$ diagram of FIG. 6, of −8 volts and −12 volts, respectively, are utilized in the logic circuits associated with the control memory loop registers.

In FIG. 7 the loop shift register 47 does not actually close directly upon itself in the CCD shift register path thereof. It closes only through time-division-signal-controlled logic; and two transistors 68 and 69 schematically represent potential wells at the output and input portions of the charge coupled device part of the loop register. These transistors are clocked by negative-going clock signals $\Phi_1'$ and $\Phi_2'$ on their respective gate electrodes.

A charge packet propagated through register 47 is ultimately drawn under the drain electrode of transistor 68 during a $\Phi_1'$ shift clock pulse. That charge persists in that location for one-half of a bit interval, and is then erased by the occurrence of a $\Phi_2$ clock pulse which draws an IGFET 70, connected in a diode arrangement, into conduction for draining the charge through metallic circuits back to the shift clock source. However, during that one-half bit interval, the effect of the charge at the drain electrode of transistor 68 is applied by a circuit 71 to the gate electrode of an IGFET 72 for blocking conduction in that transistor. That IGFET is part of a gated double inverter. Of course, in the absence of a charge at the drain electrode of transistor 68, the corresponding lower voltage enables IGFET 72 for conduction. However, such conduction cannot take place unless a further IGFET 73 is also enabled in a manner which will be subsequently described.

Assuming, however, that transistor 72 is blocked, the negative voltage of the $\Phi_1'$ clock pulse is applied through a diode-connected IGFET 76 to a gate electrode of an IGFET 77 for enabling conduction in that transistor. Such conduction indeed takes place from a reference voltage connection $V_{r1}$ through transistor 77 and a diode-connected IGFET 74 to the $\Phi_1'$ clock pulse circuit. This operation results in a positive-going or high output signal on the circuit 63. That same signal is applied to an enabling input connection of the AND gate 49 and to further circuits to be described, for enabling application of shift clock signals to register 36 in FIG. 4.

It is assumed first that the first bit time in each time slot of signals in the row shift registers of the merging time slot interchanger is a busy bit time. It is further assumed that a busy bit in the binary ONE, or high, voltage condition is applied on the circuit 62 for actuating gate 49 when the signal on circuit 63 is high. The resulting high output of gate 49 is applied through NOR gate 50 as a low voltage setting signal to a bistable, or flip-flop, circuit 75 including IGFETS 78, 79, 80, and 81. Drive IGFETS 78 and 79 have their gate and drain electrodes cross-connected to provide the desired bistable operation. The load IGFETS 80 and 81 are diode-connected and couple the drain electrodes of IGFETS 78 and 79 to the reference voltage source $V_{r2}$. Source electrodes of IGFETS 78 and 79 are coupled to the reference source $V_{r1}$. The aforementioned setting signal from NOR gate 50 biases IGFET 78 for conduction and the resulting current flow through IGFETS 78 and 80 biases IGFET 79 off. Meanwhile, the minus twelve volts from source $V_{r2}$ are extended through IGFET 81 to hold IGFET 78 in a conducting condition, even though gate 49 subsequently becomes disabled and thereby causes NOR gate 50 to attempt to provide a high voltage signal to the setting input of the bistable circuit.

The high voltage at the drain electrode of IGFET 78, while IGFET 80 conducts, blocks conduction in IGFET 73 for so long as the bistable circuit remains set. In addition, a diode-connected IGFET 82 conducts current from the drain electrode of transistor 78 through a capacitor 83 to the $\Phi_1'$ source. This flow charges capacitor 83 rapidly and that charge is held for the remainder of the same $\Phi_1'$ interval. However, the charging operation can draw insufficient current to reset bistable circuit 75.

In the next succeeding $\Phi_2'$ clock pulse interval, transistor 69 is enabled, and the charge on capacitor 83 is transferred from that capacitor to a potential well position under the drain electrode of transistor 69. This action has now achieved recirculation of the charge which had theretofore been under the drain electrode of transistor 68.

At the same time that the shift clock signal $\Phi_2'$ goes negative as aforesaid, it draws a diode-connected IGFET 86 into conduction from the drain electrode of transistor 78. This operation applies a sufficiently large negative-going signal to the gate electrode of IGFET 79 and thereby resets the bistable circuit. In addition, IGFET 73 is enabled for conduction; and current flow therethrough and through IGFETS 72 (when there is no charge in 68) and 76 develops a positive-going signal across the latter IGFET for blocking conduction in IGFET 77, and thereby allowing the lead 63 to go negative during the next succeeding $\Phi_1'$ shift clock pulse.

Usually only one charge packet is permitted to circulate in the loop shift register 47 at one time. During time slots when that charge packet is not under the drain electrode of transistor 68, the resulting low output signal on circuit 71 to the IGFET 72 holds the latter device enabled. Since the bistable circuit 75 is in the reset state, i.e., IGFET 78 nonconducting, IGFET 73 is also enabled and current flows from the reference voltage source $V_{r1}$ through IGFETS 73, 72, and 76 to the $\Phi_1'$ clock circuit. The voltage developd across diode-connected IGFET 76 biases IGFET 77 to a nonconducting state and thereby allows the lead 63 to be in a low voltage condition in each $\Phi_1'$ interval. Thus, the input gate 46 to the interchanger crosspoint shift register 36 in FIG. 4 is blocked in such interval as well as in each $\Phi_2$ interval.

Accordingly, gate 46 is enabled only in a time slot when transistor 68 has a charge under its drain electrode. If there is no busy bit in the input signal to the associated row shift register read station, however, gate 46 remains closed because gate 49 cannot be actuated to set the bistable circuit at the start of the busy bit time. If a busy bit is present, that gate 46 is held open for all but the last one-half bit time ($\Phi_2'$ interval) of the remainder of that time slot by the action of the bistable circuit 75 in the read-write station 48.

When new information is to be written into loop register 47, the signal level on lead 52 is appropriately altered in the time slot to be affected. Lead 52 is normally in a low signal state and does not, therefore, affect bistable circuit 75. No change is required to write a ZERO because any previously existing control bit is erased when its corresponding time slot signal busy bit is erased to take down a call connection. To write a ONE the signal level of lead 52 is raised during the $\Phi_1'$ clock time to produce a low output from gate 50 for setting bistable circuit 75. Capacitor 83 is thereby charged as previously described. In the following $\Phi_2'$ clock interval the charge is transferred from capacitor 83 to the drain region of transistor 69, and bistable circuit 75 is reset by the $\Phi_2'$ signal applied through IGFET 86.

Moving on now to a consideration of the output control memory loop shift register 53 in the upper portion of FIG. 7, the read station 58 included therein is of substantially the same type as the read stations described in my aforementioned application. Thus, two potential well transistors 87 and 88 are included in the shift register path and are enabled at different times by the $\Phi_1'$ and $\Phi_2'$ shift clock signals on their respective gate electrodes. These two transistors comprise one bit location in the shift register; and during a $\Phi_1'$ shift clock pulse, the transistor 87 is enabled to draw a charge packet to its drain electrode region from a preceding bit location in the shift register 53 if that location has a charge packet available at that time. The charge rests at the drain electrode of transistor 87, and the signal level represented by the presence of a charge is coupled through a circuit 89 to an input connection of a double inverter 90.

Inverter 90 is similar to the gated double inverter described in connection with read-write station 48 except that the inverter output side, instead of the input side, is control gated by operation of an IGFET 84 in response to signals sensed at the drain electrode of a transistor 85 in the register 53. That transistor and a transistor 94 comprise another bit location preceding the location of transistors 87 and 88 in the sequence of propagation in register 53. Control exercised through IGFET 84 prevents spurious output to the lead 66 as a fixed control bit moves toward transistor 87 as will be further described. Output from the inverter 90 is coupled by way of the lead 66 to the crosspoint register 36 output control gates 56 and 57 in FIG. 4 for enabling those gates in response to the presence of a charge at the drain electrode of IGFET 87 in FIG. 7. That signal condition on lead 66 remains stable until the occurrence of the next succeeding $\Phi_2'$ pulse at the end of the time slot, and then the charge is moved to the drain electrode region of transistor 88, thereby disabling the gates 56 and 57 in FIG. 4.

It should be noted that the output of the double inverter 90 is also coupled through an OR gate 91 to gate electrodes of IGFETS 92 and 93 for disabling those devices whenever the output of inverter 90 is in its high signal condition and enabling those devices otherwise. When IGFETS 92 and 93 are enabled, a pair of shift clock leads 96 and 97 extending to crosspoint shift register 36 are held at the reference voltage $V_{r1}$ and thereby prevent the application of shift clock signals to that crosspoint register. The $V_{r1}$ voltage is not sufficiently negative to enable a potential well transistor to transfer charge. However, when the output of inverter 90 goes to its high voltage condition, IGFETS 92 and 93 are blocked; and shift clock pulses $\Phi_1$ and $\Phi_2$ on circuits from the system clock source, not shown, are applied through diode-connected IGFETS 98 and 99 to the circuits 96 and 97 for clocking the crosspoint register 36 to shift out the contents thereof at the same time that NOR gates 56 and 57 in FIG. 4 are enabled. IGFETS 92 and 93 are similarly controlled by the signal condition on the lead 63 to allow shift clock pulses to be applied to the crosspoint shift register 36 when the gate 46 is actuated to couple a time slot word signal into that register from read station 23 in row shift register 21.

In read-write station 59 of FIG. 7 a further bit location comprises two potential well transistors 100 and 101 in a bit location immediately following the read station 58 in the direction of charge propagation around loop shift register 53. During $\Phi_2'$ shift clock pulses, any charge packet at the drain electrode of transistor 100 is drawn to the drain electrode of transistor 101 for a purpose which will be described.

Otherwise, however, the presence of a charge at the drain electrode of transistor 100 is sensed, and a corresponding signal coupled by a circuit 103 to apply a blocking signal to the gate electrode of a drive transistor 106 in a double inverter 107. That inverter also includes a second drive transistor 108 having its gate electrode coupled to the drain electrode of transistor 106, and having its source electrode, along with the source electrode of transistor 106, coupled to the reference voltage supply $V_{r1}$. A pair of load transistors 109 and 110 couple the drain electrodes of transistors 106 and 108, respectively, to the $\Phi_1'$ shift clock circuit. Output lead 67 is connected to the drain electrode of transistor 108 and consequently signals on lead 67 track signals on circuit 103. Thus, the lead 67 is high to enable gate 56 in FIG. 4 whenever a charge is present under the drain electrode of transistor 100 in FIG. 7. In the absence of such a charge, lead 67 is low and is coupled through inverter 61 in FIG. 4 to enable gate 57.

The leads 66 and 67 necessarily tend to track the signal state of the writable control bit, which affects gates 56 and 57; and they will also track the signal state of the adjacent fixed bit, which follows in time sequence, for controlling readout in accordance with the series-parallel conversion algorithm. The writable bit cannot affect lead 66 as that bit passes transistors 87 and 88 because of the control gating effect of IGFET 84 in inverter 90. Any writable bit is necessarily followed in register 53 by a fixed ONE control bit which directs the appropriate crosspoint readout in accordance with the mass series parallel conversion function. A writable bit is always preceded by a no-charge bit so the output of inverter 90 is low regardless of the state of a writable bit at the drain of transistor 85. In the next time slot the writable bit is at transistor 87, the fixed bit (a ONE) is at transistor 85, IGFET 84 is blocked, and lead 66 remains low while $\Phi_1'$ is low. When $\Phi_2'$ goes low in the same time slot there may be some transient signal variation on lead 66, but it is ineffective insofar as MTSI column circuits are concerned because there is no signal available at the readout end of register 36 in the $\Phi_2'$ clock phase. In a still further time slot the writable bit has moved to read-write station 59, the fixed bit is at transistor 87, and the no-charge state at transistor 85 keeps IGFET 84 enabled to allow inverter 90 to track the register signal state sensed at lead 89.

When the fixed control bit reaches transistor 100 in a subsequent time slot, it affects the signal state on lead 67. However, by that time there is no longer a charge present at the transistor 87, lead 66 is low, gates 56 and 57 are disabled, and it is immaterial what signal condition is present on lead 67.

Each time that a new call connection is set up, the writable bit in loop shift register 53 of FIG. 7 has new information written therein. This information is provided, as previously mentioned, by way of the control lead 60 and the control information lead 55, both extending from decoder 51 in FIG. 4. When no writing is to take place, the control lead 60 has a low signal applied thereon which enables an IGFET 114 to conduct from reference voltage source $V_{r1}$ through a diode-connected transistor 111 to the more negative reference voltage source $V_{r2}$. The potential difference thereby developed across IGFET 111 applies a high voltage blocking signal to the gate electrode of an IGFET 118. The control information lead 55 has a high signal, and the transistor 113 is blocked at this time. No current flows through the capacitor 116 or IGFET 117 during a $\Phi_1'$ clock pulse. At the beginning of a $\Phi_2'$ clock pulse, any charge at transistor 100 is moved to the drain electrode region of transistor 101. Circuit 103 is thereby forced to the low voltage condition, and the control information in register 53 has been shifted without change.

When it is necessary to write new information into the writable bit location, central control causes decoder 51 to apply a high signal on lead 60 during a time slot when lead 66 is to enable gates 56 and 57. That high signal blocks IGFET 114 and thereby allows the low enabling signal from source $V_{r2}$ to be coupled through IGFET 111 to the gate electrode of IGFET 118. The latter IGFET then couples circuit 103 through a diode-connected IGFET 119 to the $\Phi_1'$ shift clock circuit for thereby erasing any remanent charge under the drain electrode of transistor 100 at that time.

If a high control signal is on lead 55 during a write operation, IGFET 113 is blocked and no new charge is imposed upon capacitor 116 or transistor 101. However, if a binary one is to be written into the control loop, lead 55 is provided with a low control signal during the $\Phi_1'$ clock time. That signal enables IGFET 113 thereby allowing the reference voltage $V_{r1}$ to be coupled through diode-connected IGFET 117 and capacitor 116 to the now negative $\Phi_1'$ shift clock circuit. Capacitor 116 is charged at this time. Upon termination of the $\Phi_1'$ shift clock pulse interval, the $\Phi_2'$ clock signal is negative and enables transistor 101 to remove the charge from capacitor 116 to the drain electrode region of transistor 101, thereby writing a binary ONE signal into the control loop in the writable control bit location for the time slot in question. During the $\Phi_2'$ clock pulse interval, the control lead 60 is returned to its normal low voltage condition for once more isolating the reference source $V_{r1}$ from capacitor 116 and transistor 101.

It is apparent from FIGS. 4 and 7 that the matrix of the merging time slot interchanger exhibits a fair degree of complexity. However, in all complexity comparisons for time division multiplex systems, the product of the number of time slots per frame and the number of input lines to the matrix is of considerable importance. In prior art systems utilizing separate stages for time slot interchangers and series-parallel converters, that product appears at least once per stage; whereas in the present invention, the functions of the two stages are merged into one matrix so that the important product appears but once. In prior art systems where there are storage crosspoints and time slot interchanging is distributed across the network, the product appears but once per matrix and complexity comparisons must be made on a signal bit location basis for each matrix crosspoint. On that type of basis, the number of full-frame shift registers is a dominant factor. Thus, the present invention compares favorably because it needs only one full-frame shift register per crosspoint of a square matrix; and that shift register need have only one bit location per time slot because it is a control memory shift register, as compared to the need in the prior art for multiple bit locations per time slot of each shift register because the prior art shift registers are in the time division multiplex signal flow paths in the matrix crosspoints.

Although numerous path search techniques are known in the art and the path search does not comprise a part of the present invention, a brief discussion of one path search technique may facilitate an understanding of some of the advantages of the present invention. Given network input and output highway numbers and input and output time slot numbers for a network such as that illustrated in FIG. 2, an ordinary system usage map in the central control memory is advantageously examined to determine an output circuit number to be employed for merging time slot interchanger stage $MTSI_1$ in FIG. 2. This circuit must be one which has a free time slot number corresponding to the number of the calling input highway number to stage $MTSI_1$.

In lieu of a network map, the appropriate circuit and time slot can be determined by clocked logic (not shown) of a type similar to that shown for path search in the aforementioned Krupp-Tomko U.S. Pat. application, Ser. No. 212,089. That is, logic is provided to monitor busy bit time intervals at appropriate circuit points to determine circuit availability. In this case, all stage $MTSI_1$ column circuits are monitored at busy bit times to locate an available path and time slot. For example, in a square MTSI stage (one column wire per column circuit and equal numbers of rows and columns) a NAND gate at each column circuit is enabled in the busy bit time of the time slot number corresponding to the $MTSI_1$ input circuit number and produces an output indication if the bit is a ZERO. Each high NAND gate output indicates an available useful time slot. If rectangular MTSI stages (different numbers of rows and columns) are involved some additional logic is required. Thus, the pair of NAND gates for the wires in each stage $MTSI_1$ column circuit are ORed to look for a free time slot on either wire of the pair, outputs of gates 46 of each pair of crosspoint logic units 40 that share a common register 36 along the column circuit of the called highway are NANDed to locate a register 36 that is not in use, and for each stage $MTSI_1$ column circuit the output of its mentioned OR function is ANDed with the output of the corresponding stage $MTSI_2$ NAND function to find an $MTSI_1$ column circuit with a time slot free at the same time that the $MTSI_2$ called column circuit has a free time slot. Each high AND gate output indicates an available useful time slot and the $MTSI_1$ NAND gate outputs for the same column circuit indicate which pair of column wires to be used.

Once circuit and time slot numbers at the output of stage $MTSI_1$ have been determined, the remaining path parameters are all automatically fixed. In stage $MTSI_2$, the output circuit number is fixed by the number of the time slot interchanger serving the called party's highway. Because of the nature of operation of the merging time slot interchanger, the stage $MTSI_2$ output time slot number must be the same as the input circuit number to that stage; and that input circuit number must be the same as the output circuit number of stage $MTSI_1$, which circuit number was determined from either the logic or the network usage map as just mentioned. The input time slot number to stage $MTSI_2$ must be the same as the output time slot number of stage $MTSI_1$, which number in turn corresponds to the input, i.e., calling, highway number to the stage $MTSI_1$. Thus, from the given information identifying calling and called highway and time slot numbers, taken together with a stage $MTSI_1$ output highway number determined from the network map in central control memory, all other time and circuit parameters of the three-stage path are necessarily fixed as just outlined. The final time slot interchanger stage, with its interchanger serving the called highway, simply shifts the stage $MTSI_2$ output time slot signal to the called party's time slot number.

In setting up a call connection, once the time space path has been determined as just outlined, the respective control memories are written in all stages at crosspoints defined by the specified circuit numbers and in the time slots specified. In order to take down a call connection, it is necessary only to erase the busy bit for that call at the multiplexers for each party. This disables recirculation of the control bit in the input control memory loops involved in that connection as the vacated time slot passes through the network. It is not necessary to erase the output control memory loop register writable bit since that bit is erased by operation of IGFETs 118 and 119 when a new call connection utilizing the same crosspoint is set up. Since no time division signals can enter the crosspoint shift register where a binary zero busy bit has blocked input control memory recirculation and since the final time slot signal of a call is cleared from the crosspoint shift register on the final utilization before busy erasure, it is immaterial whether or not the writable control bit in the output control memory loop is present after the busy bit has been erased.

Although the present invention has been described in connection with a particular embodiment thereof, it is to be understood that additional embodiments, applications, and modifications which will be obvious to those skilled in the art are included within the spirit and scope of the invention.

What is claimed is:

1. In a time division multiplex switching network for establishing communication between a given time slot of a time division multiplex signal on one of plural input highways and another time slot of a time division multiplex signal on one of plural output highways, a merged time slot interchanger and mass series-parallel converter comprising a matrix including a plurality of matrix input row signal propagation paths each comprising a shift register, a plurality of matrix output column circuits each intersecting each of said row paths at a different point along such path, and plural controllable matrix crosspoint coupling logic units, one at each intersection of each of said matrix row paths and one of said matrix column circuits for selectively establishing coupling between such path and such circuit, said coupling logic unit comprising a buffer storage means, means for coupling selectable time slot signals from a row path to said storage means in accordance with a time slot interchanging mode of operation, and means for coupling time slot signals from said storage means to such column circuit in a predetermined recurrent time slot in accordance with an electric mass series-parallel converter function.

2. The switching network in accordance with claim 1 in which, means are provided for impressing a time skew upon input circuit signals in corresponding time slot positions of each time division multiplex signal frame in said input highways, the skew increasing from one time slot interval at a first of said input highways at a rate of one such interval per highway through a predetermined sequence of said input highways, and means for eliminating said time skew from output highway signals in corresponding time slot positions of each time division multiplex signal frame.

3. The network in accordance with claim 1 in which, each of said matrix row shift registers and each of said buffer storage means comprises a charge coupled device shift register.

4. The network in accordance with claim 1 in which said input coupling means for said buffer storage means in each of said coupling logic units comprises a control memory shift register loop for storing control signal information indicating by appearance at a loop output connection when in an input signal frame a time slot signal is to be transferred from a row shift register to said buffer storage means of such unit, means for coupling signals between a row shift register and the last-mentioned buffer storage means in response to the coincidence of said signal information appearance and a predetermined data signal from such shift register, and means for controllably recirculating signal information in said loop shift register in accordance with the signal state of a predetermined signal bit of each time slot signal in said shift register.

5. The switching network in accordance with claim 1 in which said buffer storage means output coupling in each logic unit comprises, means for selectively coupling signals from each of said row shift registers to one of said column circuits at a different time and for coupling signals from any one of said row shift registers to different ones of said column circuits at predetermined different times in a recurring sequence.

6. The network in accordance with claim 1 in which said buffer storage means output coupling means comprises, a control memory loop shift register for storing a fixed pattern of control signal information indicating when in each output signal frame a signal is to be transferred from such buffer storage means to the corresponding one of said column circuits, and means for selectively establishing signal coupling between such buffer storage means and said corresponding column circuit in response to the signal state of said control signal information.

7. The switching network in accordance with claim 6 in which each of said column circuits includes first and second wires, said selectable output coupling means in each said logic unit along a column circuit includes two coincidence gates each coupled between a common output of said buffer storage means in such unit and a different one of said wires of such column circuit, and said selective coupling means further comprises means for partially enabling both of said gates in response to the signal state of said control signal information and means for further partially enabling only one of said gates at a time in response to the signal state of an additional control signal information bit indicating one of said two wires.

8. The network in accordance with claim 1 in which there are provided first and second ones of said merged time slot interchanger and mass series-parallel converter matrices, means for coupling said input highways to different ones of said row propagation paths of said first matrix, means for coupling said column circuits of said first matrix to said row propagation paths of said second matrix, and means for coupling said column circuits of said second matrix to said output highways.

9. The network in accordance with claim 8 in which said means for coupling said second matrix column circuits to said output highways comprises a stage of time slot interchangers, one interchanger providing the coupling to each output highway.

* * * * *